US007363481B2

(12) United States Patent
Sugimori (10) Patent No.: US 7,363,481 B2
(45) Date of Patent: Apr. 22, 2008

(54) INFORMATION PROCESSING METHOD FOR CONTROLLING THE FUNCTION OF A PLURALITY OF PROCESSORS, PROGRAM FOR REALIZING THE METHOD, AND RECORDING MEDIUM

(75) Inventor: Shigeo Sugimori, Son (JP)

(73) Assignee: Sony Corporation (JP)

( * ) Notice: Subject to any disclaimer, the term of this patent is extended or adjusted under 35 U.S.C. 154(b) by 422 days.

(21) Appl. No.: 10/523,786

(22) PCT Filed: Aug. 18, 2003

(86) PCT No.: PCT/JP03/10409

§ 371 (c)(1),
(2), (4) Date: Feb. 9, 2005

(87) PCT Pub. No.: WO2004/017200

PCT Pub. Date: Feb. 26, 2004

(65) Prior Publication Data

US 2006/0010312 A1    Jan. 12, 2006

(30) Foreign Application Priority Data

Aug. 19, 2002 (JP) .............................. 2002-238437

(51) Int. Cl.
*G06F 9/28* (2006.01)
(52) U.S. Cl. ........................................ 713/2; 712/206
(58) Field of Classification Search .................... 713/2; 712/206
See application file for complete search history.

(56) References Cited

U.S. PATENT DOCUMENTS 5,410,651 A * 4/1995 Sekizawa et al. ........... 709/224

7,185,179 B1 * 2/2007 Furusho ...................... 712/214

FOREIGN PATENT DOCUMENTS

| JP | 59-100967    | 6/1984 |
| JP | 02-064844    | 3/1990 |
| JP | 07-175661    | 7/1995 |
| JP | 08-161283    | 6/1996 |
| JP | 08-185384    | 7/1996 |
| JP | 11-031076    | 2/1999 |
| JP | 2000-235495  | 8/2000 |

OTHER PUBLICATIONS

International Search Report dated Oct. 21, 2003.

* cited by examiner

*Primary Examiner*—Thuan Du
(74) *Attorney, Agent, or Firm*—Rader Fishman & Grauer PLLC; Ronald P. Kananen (57) ABSTRACT

There is provided an information processing method characterized in that, in accordance with an instruction from a host CPU 411, either a CPU 103 or 104 loads a common code and an instruction code defined to be executed by itself from an external memory 110 into an internal memory 101, the other CPU loads an instruction code defined to be executed by itself from the external memory 110 into the internal memory 101, and then the respective CPUs load the respective instruction codes defined to be executed by themselves that are loaded in the internal memory 101, and execute the common code that is loaded in the internal memory 101 as required.

12 Claims, 8 Drawing Sheets

PRIOR ART

FIG.6

PRIOR ART

FIG. 7

PRIOR ART

FIG. 8

PRIOR ART

INFORMATION PROCESSING METHOD FOR CONTROLLING THE FUNCTION OF A PLURALITY OF PROCESSORS, PROGRAM FOR REALIZING THE METHOD, AND RECORDING MEDIUM

TECHNICAL FIELD

The present invention relates to an information processing method, a program for realizing the method, and a recording medium on which the program is recorded.

BACKGROUND ART

In recent years, a system-on-chip (hereinafter referred to as "SOC") having a CPU (central processing unit) and a memory mounted on a single semiconductor chip has been developed. This SOC has the advantage that the bus width between the CPU and the memory can be increased, and is incorporated into a system as a constituent element. In this SOC, since the capacity of a mountable memory is limited according to the size of the chip, it is important to efficiently use the mounted memory.

There are various kinds of audio compression methods (Codec), such as MPEG1 Audio and MPEG2 Audio, which are recently used in music distribution and portable audio devices. In these methods, if a system for executing compression and expansion of audio data is constructed of a plurality of CPUs (multiprocessor), the load can be divided and a process which takes time with a single CPU can be processed at high speed. In other words, for example, by allocating a CPU to each codec, it is possible to realize the transcoding operation of decoding data through a first CPU and simultaneously encoding the decoded data through a second CPU, and the operation of performing parallel encoding through different codecs.

Figure 5:
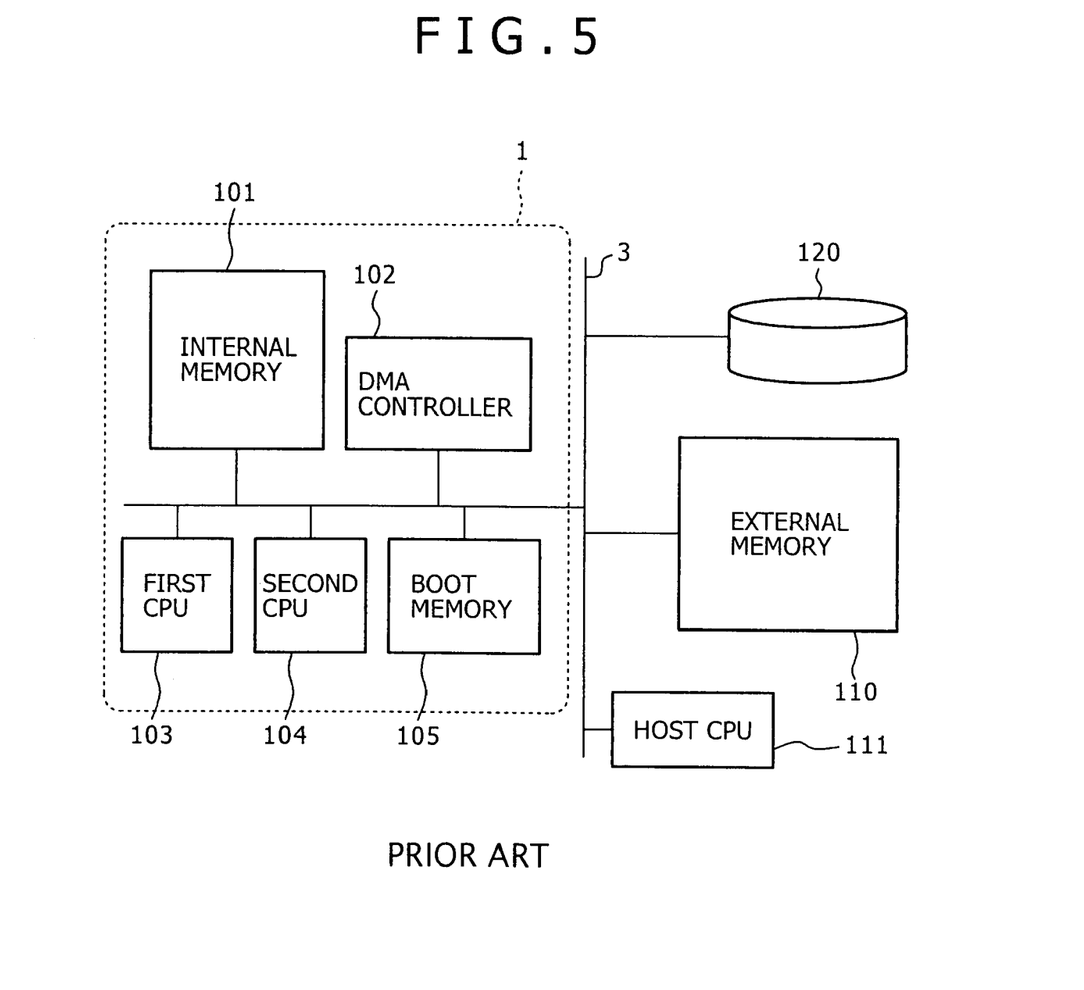
FIG. 5 is a block diagram showing a structure of s conventional information system.

FIG. 5 is a block diagram showing the construction of a conventional information processing system. As shown in FIG. 5, the conventional information processing system is equipped with a bus 3 as well as a chip 1, an external memory 110, a host CPU 111 and a server 120, all of which are interconnected by the bus 3. The chip 1 includes an internal memory 101, a DMA (Direct Memory Access) controller 102 which transfers an executable code or data from the external memory 110 directly to the internal memory 101, a first CPU 103, a second CPU 104, and a boot memory 105. The internal memory 101 formed in the chip 1 and the DMA (Direct Memory Access) controller 102, the first CPU 103, the second CPU 104 and the boot memory 105 are interconnected by a bus formed in the chip 1.

The chip 1 having the above-mentioned construction is called a "loosely-coupled multiprocessor" because the chip 1 is equipped with a plurality of CPUs which operate independently of one another and share the internal memory 101.

In the information processing system having the above-mentioned construction, first, bootstraps for the first CPU 103 and the second CPU 104 are stored into the boot memory 105 in accordance with an instruction from the host CPU 111. Then, the first CPU 103 and the second CPU 104 download an executable code from the external memory 110 or the server 120 on a network to the internal memory 101 by using the DMA controller 102 in accordance with the respective bootstraps, and activate the system.

Figure 6:
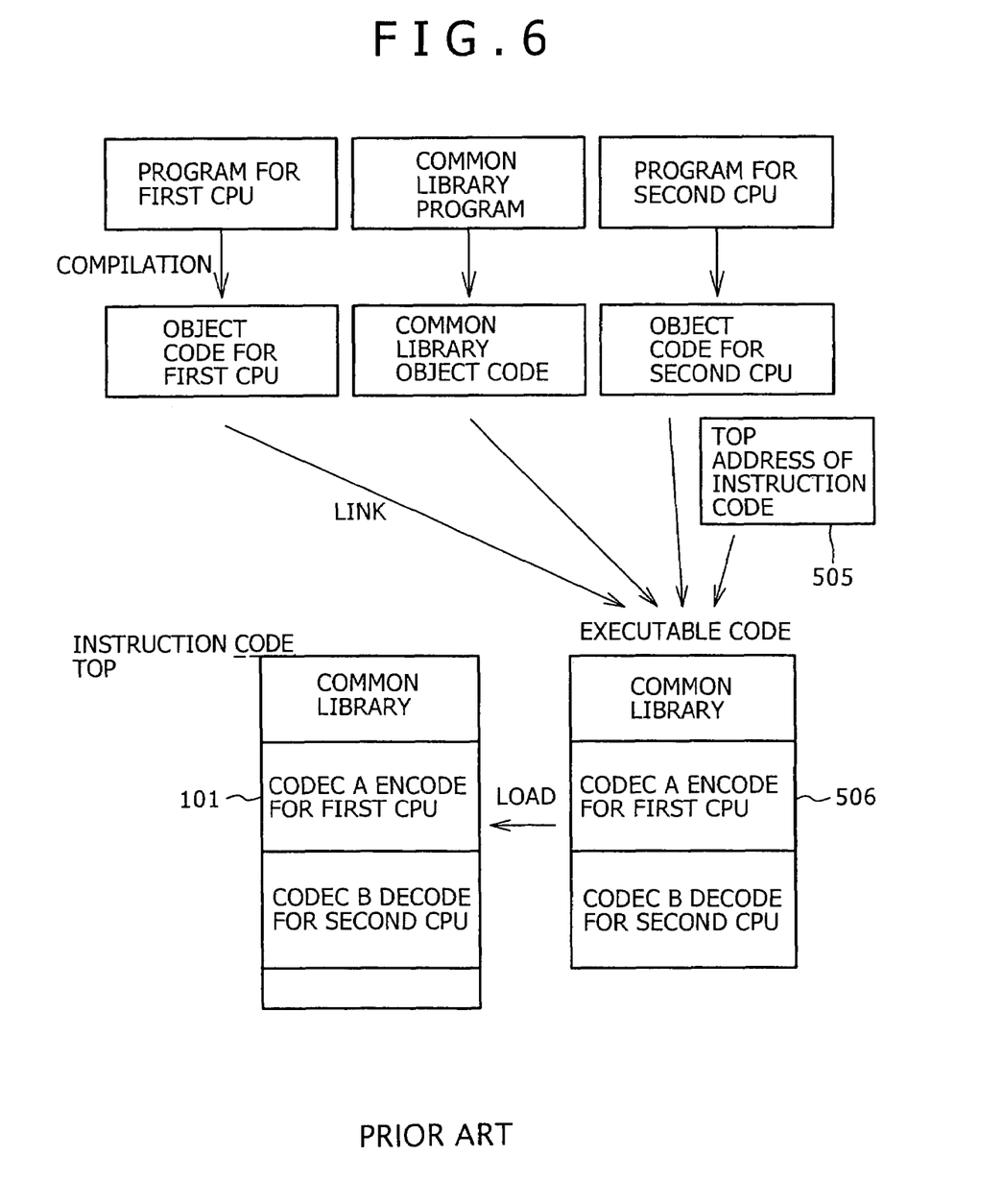
FIG. 6 is a figure explaining conventional executable code.

The executable code is generated in the following manner. As shown in FIG. 6, programs created for the respective CPU provided in the chip 1 (a program for the first CPU and a program for the second CPU) and a program to be shared by a plurality of CPUs (a common library program) are compiled to generate object codes corresponding to the respective programs (an object code for a CPU 0, an object code for a CPU 1, and a common library object code).

Then, these object codes are linked to link information 505 containing top addresses for designating locations in the internal memory 101, and an executable code is generated. Accordingly, an executable code 506 thus generated describes instructions and data as well as allocation addresses in the internal memory 101. FIG. 6 shows by way of example the executable code 506 for causing the first CPU to realize the encoding operation in a codec A and the second CPU to realize the decoding operation in a codec B.

Then, the executable code 506 is loaded into the internal memory 101.

If the OS (Operating System) of the information system has dynamic libraries and a link function or supports virtual addresses by hardware, the OS generally can change the address of an executable code during loading of a program. However, in the case where the chip 1 is incorporated in a system provided with an OS having no function like the above-mentioned one or in a system having no OS, the address of an executable code is fixed when the executable code is generated, so that a loading location for the code cannot be dynamically switched.

Accordingly, in order to enable the CPUs to operate by means of a plurality of codecs, it is necessary to hold codes corresponding to all assumable patterns in the internal memory 101 and the like. At this time, if there are a multiplicity of codecs desired to be used and all of the codes are not accommodated in the internal memory 101, the executable codes are held in the external memory 110, the server 120 or the like so that the kind of codec or the operation thereof can be switched by downloading being executed as the occasion demands.

However, as shown in FIG. 6, the code for the first CPU and the code for the second CPU are integrated in the conventional executable code 506, so that if only the operation of either one of the first CPU 103 and the second CPU 104 is to be switched, the whole of the executable code 506 needs to be reloaded into the internal memory 101.

Figure 7:
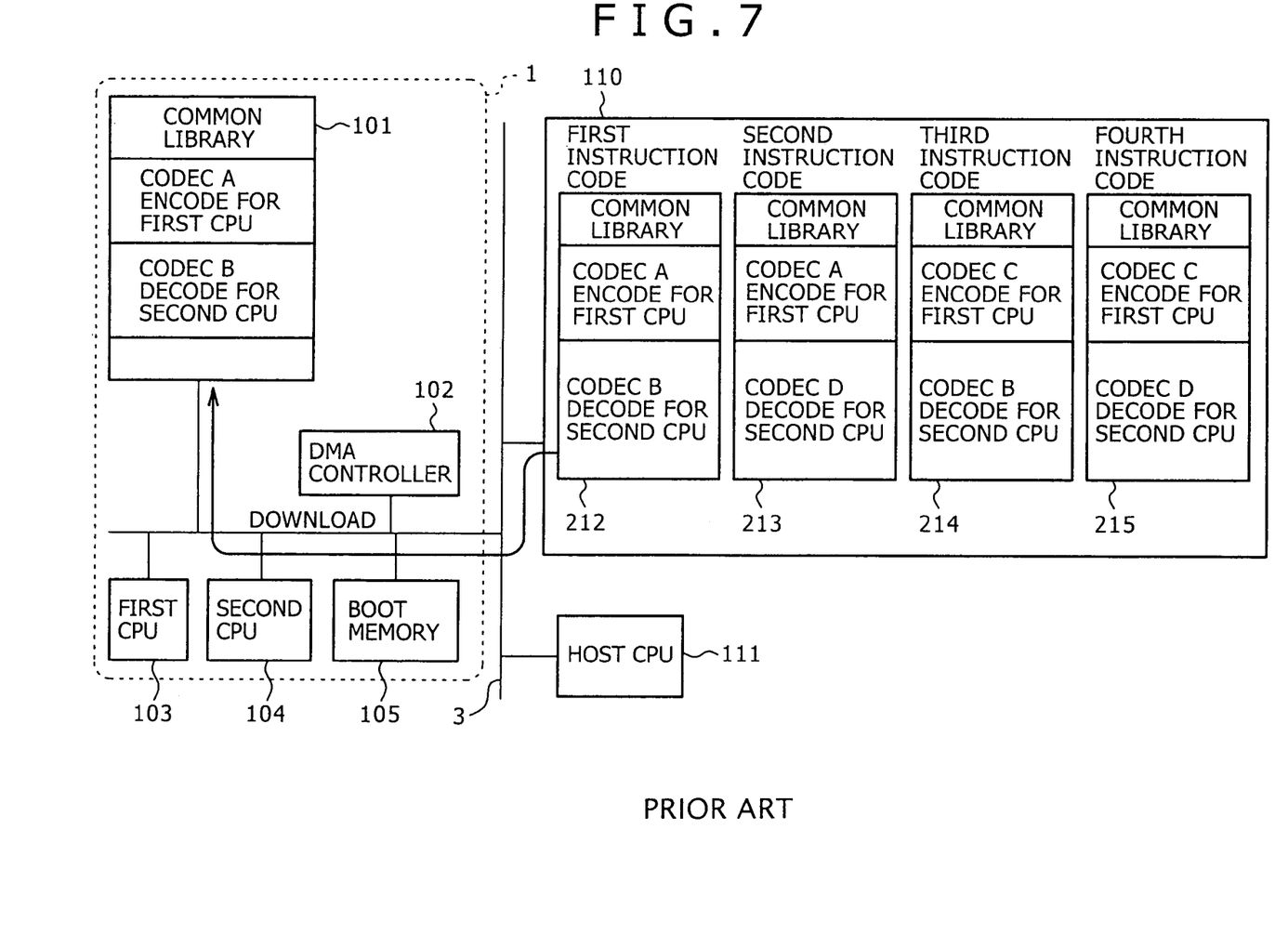
FIG. 7 is a diagram explaining an operation of the information system shown in FIG. 5.
Figure 8:
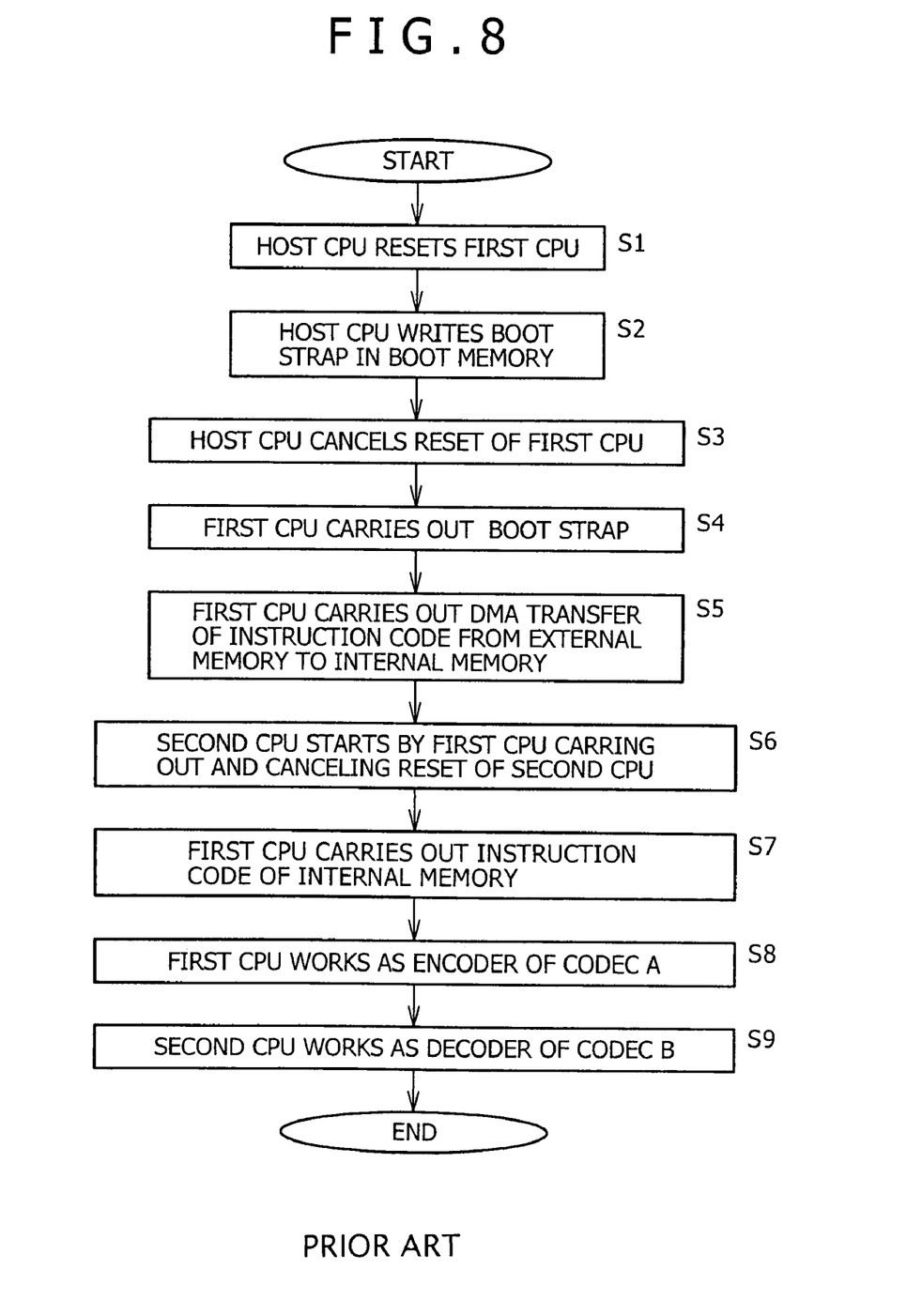
FIG. 8 is a flow chart showing an operation of a first CPU and a second CPU shown in FIG. 5.

The switching of the operation in the conventional information processing system will be described below with reference to FIGS. 7 and 8. FIG. 7 shows the case where the first to fourth instruction codes 212 to 215 are previously stored in the external memory 110 and the first instruction code 212 is first loaded into the internal memory 101. The second instruction code 213 contains a code which causes the first CPU 103 to perform the encoding operation by means of on a codec A and causes the second CPU 104 to perform the decoding operation by means of a codec D. The third instruction code 214 contains a code which causes the first CPU 103 to perform the encoding operation by means of on a codec C and causes the second CPU 104 to perform the decoding operation by means of a codec B. The fourth instruction code 215 contains a code, which causes the first CPU 103 to perform the encoding operation by means of on the codec C and causes the second CPU 104 to perform the decoding operation by means of the codec D.

The operations of the first and second CPUs 103 and 104 shown in FIG. 7 will be described with reference to FIG. 8. First, in Step S1, the host CPU 111 resets the first CPU 103, and in Step S2, the host CPU 111 writes a bootstrap to the boot memory 105. Then, in Step S3, the host CPU 111 cancels the reset state of the first CPU 103. Then, in Step S4, the first CPU 103 executes the bootstrap written in the boot memory 105, and in Step S5, transfers via DMA, for example, the first instruction code 212 from the external memory 110 to the internal memory 101 by using the DMA controller 102.

In Step S6, after the first CPU 103 confirms the completion of the transfer, the first CPU 103 resets the second CPU 104, and then activates the second CPU 104 by canceling the reset state of the second CPU 104. In Step S7, the first CPU 103 executes the instruction code for the first CPU 103 stored in the internal memory 101.

In this manner, in Step S8, the first CPU 103 operates as the encoder of the codec A, and in Step S9, the second CPU 104 operates as the decoder of the codec B by executing the instruction code for the second CPU 104 stored in the internal memory 101.

At this time, since the instruction code for the first CPU and the instruction code for the second CPU are integrated as one instruction code as mentioned above, if, for example, the first CPU 103 is to be operated as the encoder of the codec C, the whole of the first instruction code 212 loaded in the internal memory 101 needs to be replaced with the third instruction code 214 even if the function of the second CPU 104 does not need to be changed.

Accordingly, the above-mentioned conventional information processing system has the following problems. First, since instructions for the first CPU 103 and instructions for the second CPU 104 are integrally compiled, the combination of instructions which form an executable code is fixed. For this reason, in order to enable a plurality of CPUs to operate by means of a plurality codecs, it is necessary to hold compiled codes corresponding to individual operating states in the external memory 110 (or the server 120 on the network) in advance.

In addition, since one executable code is formed by instructions for the first CPU 103 and instructions for the second CPU 104 as mentioned above, the size of an executable code becomes large. Accordingly, the size of a code to be replaced in the internal memory 101 becomes large, so that code replacement time becomes long.

Furthermore, since one executable code is formed by instructions for the first CPU 103 and instructions for the second CPU 104 as mentioned above, even when, for example, the operation of only the first CPU 103 is to be changed as mentioned above, the operation of the second CPU 104 must also be interrupted. In other words, for example, during the transcoding operation of encoding the result decoded by the second CPU 104 under the codec B, by means of the first CPU 103 under the codec A, only the operation of the first CPU 103 cannot be changed, and the decoder of the second CPU 104 must also be interrupted.

The present invention has been made in order to solve the above-mentioned problems, and an object of the present invention is to provide an information processing method for an information processing system having a plurality of CPUs, a program which realizes the information processing method, and a recording medium on which the program is recorded, which method is capable of reducing the necessary storage capacity of the system and enhancing the processing speed thereof, which also is capable of easily changing the function of each of the CPUs without affecting the operation of the other CPUs.

DISCLOSURE OF THE INVENTION

The object of the invention is achieved by providing an information processing method, a program for realizing the information processing method, or a recording medium on which the program is recorded, the method being realized in a system in which a processor including a plurality of central processing units and internal storage means, external storage means in which are stored a common code to be executed in common by the plurality of central processing units and an instruction code to be executed respectively by a predetermined one of the central processing units, and host processing means are interconnected by a bus, which method is characterized by including: a step of loading, by means of one of the central processing units, the common code and the instruction code defined to be executed by one of the central processing units, into the internal storage means from the external storage means in accordance with an instruction from the host processing means; a step of loading, by means of one of other central processing units, the instruction code defined to be executed by the one of other central processing units, into the internal storage means from the external storage means; and a step of executing the common code and the instruction codes defined to be executed by the central processing units, which are loaded in the internal storage means, by means of the respective central processing units.

According to this means, since each of the central processing units loads an instruction code defined to be executed by itself into the internal storage means and executes the instruction code loaded therein, the common code and the instruction codes can be efficiently stored in the external storage means, whereby it is possible to reduce the necessary storage capacity of the external storage means and the amount of information to be loaded from the external storage means into the internal storage means.

In addition, according to the information processing method, the program for realizing the information processing means, or the recording medium on which the program is recorded, which method further includes: a step of selectively resetting the central processing units by means of the host processing means; a step of newly loading an instruction code defined to be executed by a selectively reset central processing unit, from the external storage means into the internal storage means by means of the selectively reset one itself in accordance with an instruction from the host processing means; and a step of executing, by means of the reset central processing unit, the instruction code defined to be executed by the reset central processing unit itself, which is newly loaded in the internal storage means, it is possible to easily change the function of the selected central processing unit without affecting the operation of the other central processing units.

BEST MODE FOR CARRYING OUT THE INVENTION

An embodiment of the present invention will be described below in detail with reference to the accompanying drawings. Throughout the drawings, the same reference numerals are used to denote the same or corresponding sections.

Figure 1:
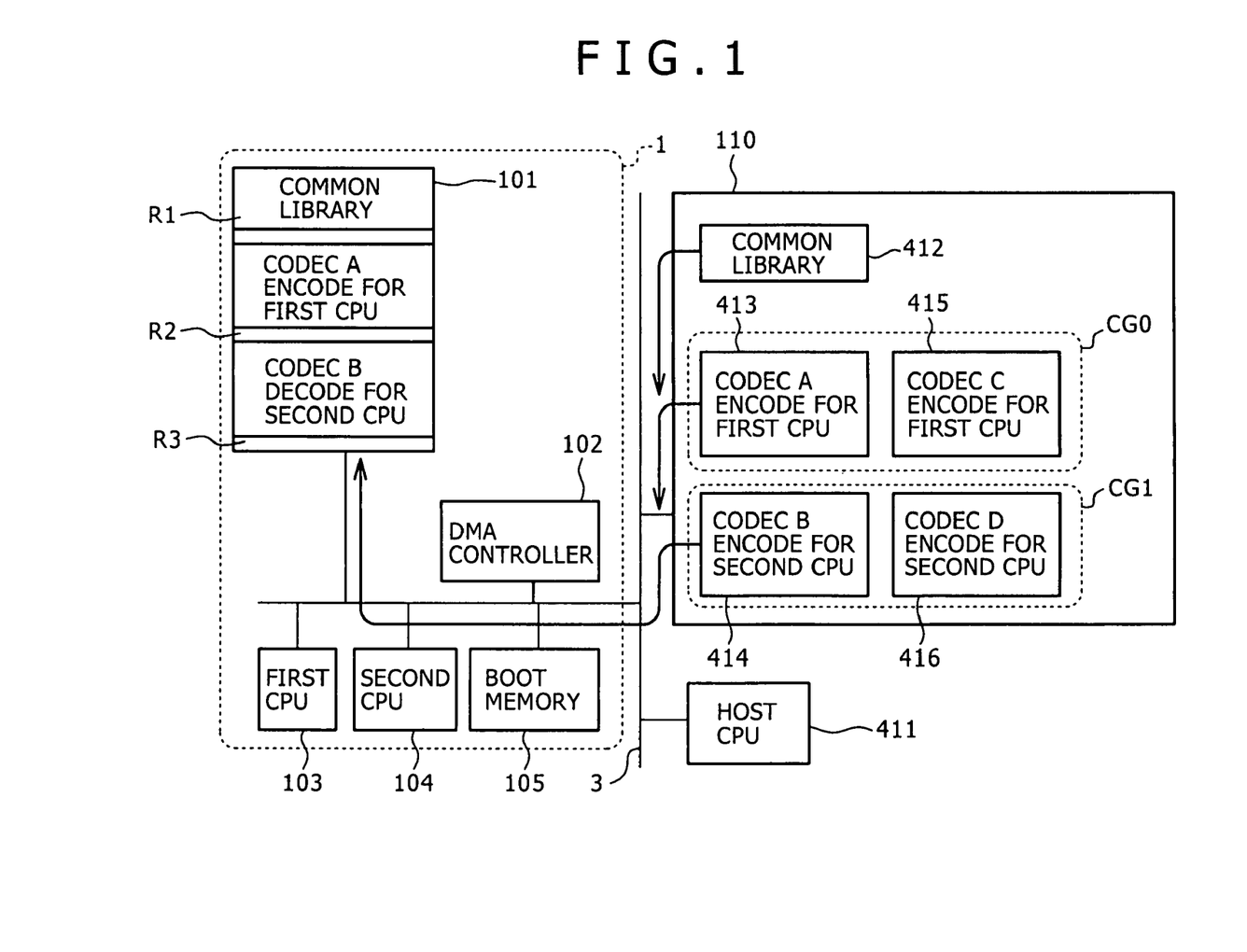
FIG. 1 is a diagram explaining an information processing of an embodiment of the present invention.

FIG. 1 is a diagram for explaining information processing according to the embodiment of the information processing system. As shown in FIG. 1, the information processing according to the embodiment is realized by an information processing system including a host CPU 411 and a chip 1 as well as an external memory 110 all of which are interconnected by a bus 3. The chip 1 is provided with a DMA controller 102, a first CPU 103, a second CPU 104, a boot memory 105, and an internal memory 101 all of which are interconnected by an internal bus.

It is to be noted that even in an information system equipped with a server on a network connected to the bus 3, in place of the external memory 110 or in combination with the external memory 110, the information processing according to the present embodiment may be realized.

An executable code according to the present embodiment, which is to be executed in the information processing system, will be described below with reference to FIG. 2. In the present embodiment, a common object code is linked to object codes to be executed by the respective first and second CPUs 103 and 104 and executable codes for the respective first and second CPUs 103 and 104 are generated so that the first CPU 103 and the second CPU 104 can operate independently.

Figure 2:
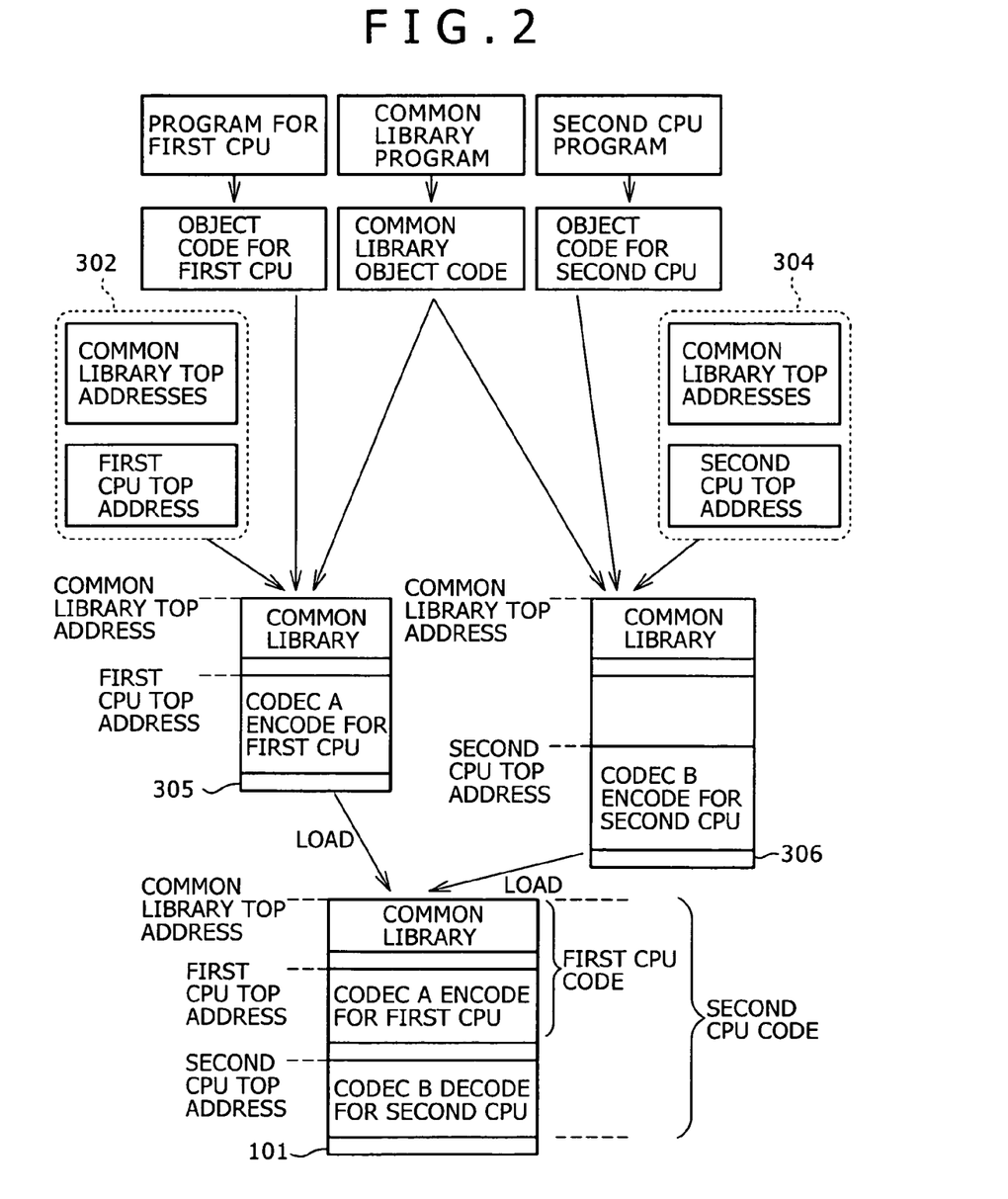
FIG. 2 is a diagram explaining an executable code of the embodiment of the present invention.

In other words, as shown in FIG. 2, an object code for the first CPU is generated by compiling a program for the first CPU to be executed by the first CPU 103, while an object code for the second CPU is generated by compiling a program for the second CPU to be executed by the second CPU 104. In addition, a common library object code is generated by compiling a common library program to be executed by the first and second CPU 103 and 104.

Then, link information 302 which describes a common-library top address indicating a storage location for the common object code in the internal memory 101 and a first-CPU top address indicating a storage location for the first-CPU object code in the internal memory 101 is linked to the object code for the first CPU and the common library object code and an executable code 305 is generated, while link information 304 which describes the same common-library top address and a second-CPU top address indicating a storage location for the second-CPU object code in the internal memory 101 is linked to the object code for the second CPU and the common library object code and an executable code 306 is generated.

Each of the top addresses is determined by taking into account a storage capacity which is necessary for the corresponding object code to be stored in the internal memory 101.

A text command for reading is created in a common library area in which the common object code is written, while in an area in which the object code for the first CPU 103 or the second CPU 104 is written, a text command for reading and a readable/writable data area are created.

The common object codes contained in an object code 301 and an object code 303 are completely the same, and the top addresses corresponding to the common object codes contained in the link information 302 and 304 are also the same. Accordingly, when both the executable codes 305 and 306 are loaded into the internal memory 101, the common object code is shared as shown in FIG. 2.

Accordingly, in the information processing according to the present embodiment, one common object code is shared by the first CPU 103 and the second CPU 104 as will be described later, so that the necessary capacity of the internal memory 101 is decreased.

An information processing method using the executable codes 305 and 306, which is realized in the above-mentioned information processing system, will be described below with reference to FIG. 1.

As shown in FIG. 1, three kinds of executable files, i.e., a common library 412, a first CPU code group CG0 and a second CPU code group CG1, are previously stored in the external memory 110. The first CPU code group CG0 contains an instruction code 413 which causes the first CPU 103 to operate as the encoder of a codec A and an instruction code 415 which causes the first CPU 103 to operate as the encoder of a codec C. The second CPU code group CG1 contains an instruction code 414 which causes the second CPU 104 to operate as the decoder of a codec B and an instruction code 416 which causes the second CPU 103 to operate as the decoder of a codec D.

The common library 412 contains instructions to be shared by the first CPU 103 and the second CPU 104, and addresses designating allocations for the respective instructions in the internal memory 101, and top addresses are determined in advance. The instruction codes 413 and 415 contain instructions to and data for the first CPU 103 as well as addresses indicating allocations for the instructions and the data in the internal memory 101. Similarly, each of the instruction codes 414 and 416 contains instructions to and data for the second CPU 104 as well as addresses indicating allocations for the instructions and the data in the internal memory 101.

At the time of initial activation, the common library 412, the instruction code 413 for the first CPU and the instruction code 414 for the second CPU are loaded into the internal memory 101 by using a bootstrap. At this time, since the common library 412 is shared by the first CPU 103 and the second CPU 104, the common library 412 needs only to be loaded into the internal memory 101 once.

In the present embodiment, the storage area of the internal memory 101 is previously divided into a first area R1, a second area R2 and a third area R3, and the common library 412 is stored into the first area R1, the instruction codes 413 and 415 for the first CPU are stored into the second area R2, and the instruction codes 414 and 416 for the second CPU are stored into the third area R3.

Figure 3:
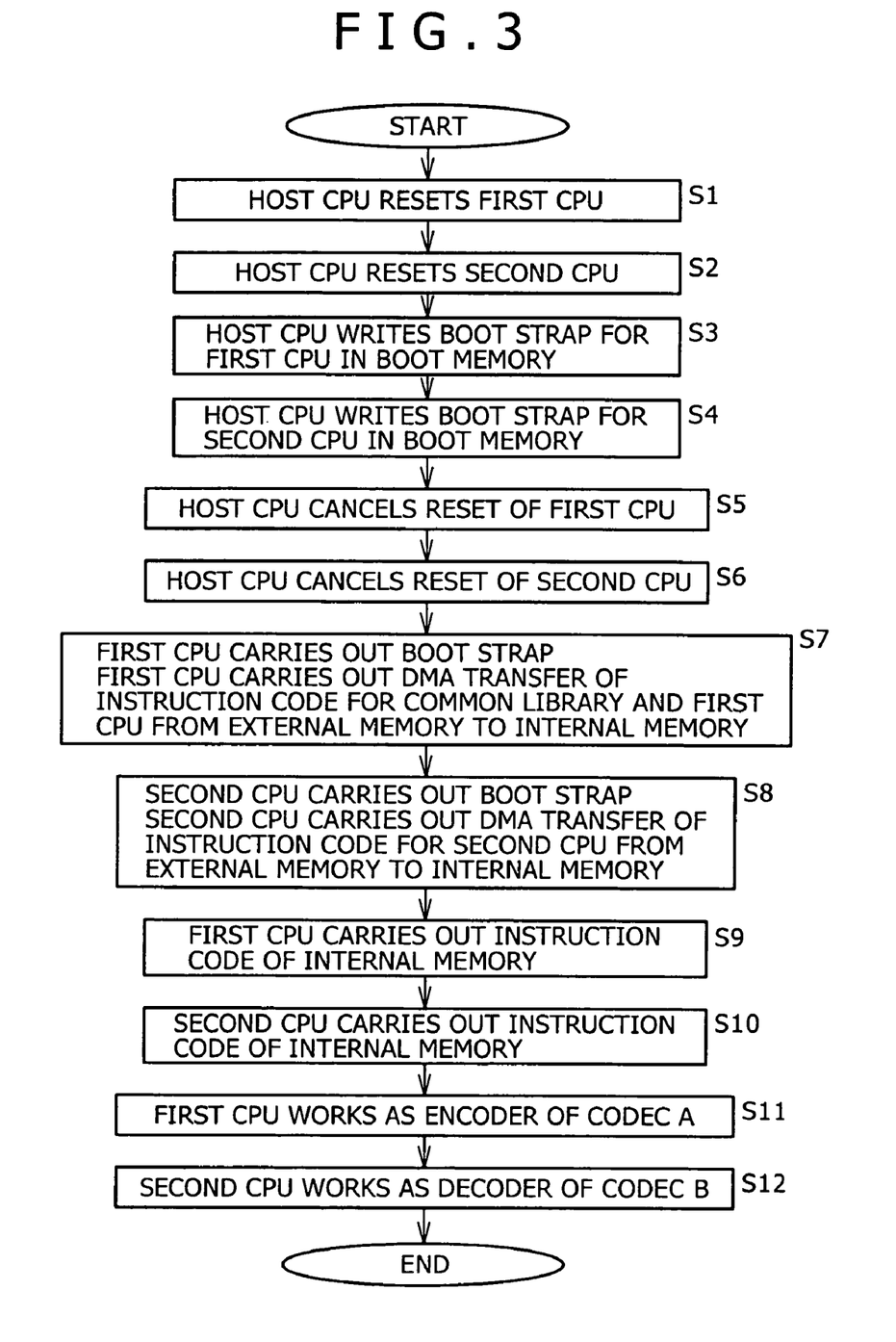
FIG. 3 is a flow chart showing an operation of a first CPU and a second CPU shown in FIG. 1.

The information processing according to the present invention will be described below in more detail with reference to FIG. 3. In Step S1, the host CPU 411 resets the first CPU 103, and in Step S2, the host CPU 411 resets the second CPU 104. Then, in Step S3, the host CPU 411 writes a bootstrap for the first CPU to the boot memory 105, and in Step S4, the host CPU 411 writes a bootstrap for the second CPU to the same boot memory 105.

In Step S5, the host CPU 411 cancels the reset state of the first CPU 103, and in Step S6, the host CPU 411 cancels the reset state of the second CPU 104.

In Step S7, in accordance with an instruction from the host CPU 411, the first CPU 103 executes the bootstrap for the first CPU stored in the boot memory 105, and the first CPU 103 DMA-transfers the common library 412 and the instruction code 413 for the first CPU from the external memory 110 to the internal memory 101 by using the DMA controller 102.

Then, in Step S8, in accordance with an instruction from the host CPU 411, the second CPU 104 executes the bootstrap for the second CPU stored in the boot memory 105, and the second CPU 104 DMA-transfers the instruction code 414 for the second CPU from the external memory 110 to the internal memory 101 by using the DMA controller 102.

Then, in Step S9, after the first CPU 103 confirms that the DMA transfer of the instruction code 413 has been completed, the first CPU 103 executes the instruction code 413 for the first CPU stored in the internal memory 101. In Step S10, after the second CPU 104 confirms that the DMA transfer of the instruction code 414 has been completed, the second CPU 104 executes the instruction code 414 for the second CPU stored in the internal memory 101.

In Step S9 and Step S10, if necessary, the first CPU 103 and the second CPU 104 read and execute the common library 412 stored in the internal memory 101.

In this manner, in Step S1, the first CPU 103 starts operating as the encoder of the codec A, and in Step S12, the second CPU 104 starts operating as the decoder of the codec B.

Figure 4:
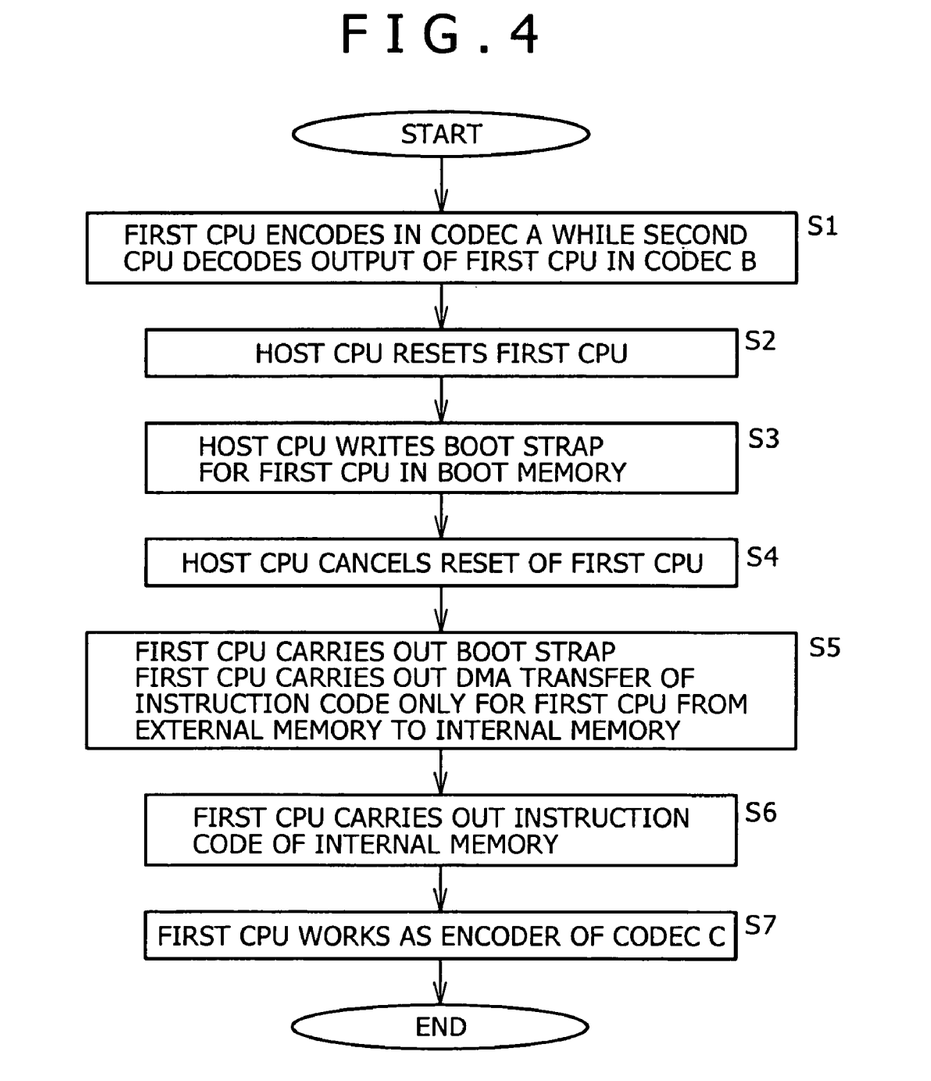
FIG. 4 is a flow chart showing an example of a method of a function change method as opposed to the first CPU shown in FIG. 1.

An information processing method for changing the function of the first CPU 103 or the second CPU 104 will be described below with reference to FIGS. 1 and 4. In the information processing method according to the present embodiment, when at least either one of the first CPU 103 and the second CPU 104 is to be changed, it is necessary to replace the instruction code for the first CPU or the second CPU which is loaded in the internal memory 101.

Accordingly, when the function of the first CPU 103 is to be changed, another instruction code for the first CPU contained in the first CPU code group CG0 is loaded into the internal memory 101, and the loaded instruction code is executed, whereas when the function of the second CPU 104 is to be changed, another instruction code for the second CPU contained in the second CPU code group CG1 is loaded into the internal memory 101, and the loaded instruction code is executed.

At this time, each of the CPUs reads the code written in the common library 412 and executes read/write of data in a data area for each of the CPUs in the internal memory 101, so that the above-mentioned replacement of instruction codes is prevented from affecting the operation of the other CPU.

A specific example of a function-changing method for the first CPU 103 shown in FIG. 1 will be described below in detail with reference to FIG. 4.

First, in Step S1, the first CPU 103 encodes data by using the codec A as described above, and the second CPU 104, as described above, decodes the data encoded by the operation of the first CPU 103.

Then, in Step S2, the host CPU 411 resets the first CPU 103. Then, in Step S3, the host CPU 411 writes a bootstrap for the first CPU to the boot memory 105.

In Step S4, the host CPU 411 cancels the reset state of the first CPU 103. Furthermore, in Step S5, the first CPU 103 executes the bootstrap written to the boot memory 105, and the first CPU 103 DMA-transfers only the instruction code 415 for the first CPU from the external memory 110 to the internal memory 101 by using the DMA controller 102.

Then, in Step S6, after the first CPU 103 confirms that the DMA transfer of the instruction code 415 has been completed, the first CPU 103 executes the instruction code 415 stored in the internal memory 101. In this manner, the function of the first CPU 103 is changed, and in Step S7, the first CPU 103 functions as the encoder of the codec C.

As described above, in the information processing method according to the embodiment of the present invention, the common library 412 stored in the external memory 110 or a server 120 is shared by the first CPU 103 and the second CPU 104. An object code to be executed by each of the CPUs is independently stored in the external memory 110 or the like, and the object code is loaded into the internal memory 101 as a unit.

Thus, according to the information processing method according to the embodiment of the present invention, it is possible to change the function of each of the CPUs without affecting the operation of the other, and it is also possible to reduce the sizes of codes to be held in the external memory 110 and the like.

In addition, according to the information processing method according to the embodiment of the present invention, since the size of an instruction code in the internal memory 101 to be replaced when the above-mentioned function is to be changed is reduced, the function of each of the CPUs can be changed at high speed.

The information processing method may be written with a program to be executed by a computer, and the program may be recorded on a recording medium such as a flexible disk or a CD-ROM. Accordingly, by executing the program through a computer, it is possible to easily realize the information processing method according to the present embodiment.

As is apparent from the foregoing, according to the information processing method according to the embodiment of the present invention, audio compression/decompression programs based on a plurality of codecs may be efficiently held in the external memory 110, and a program (instruction code) to be executed by a certain CPU may be replaced without affecting the operation of another CPU.

INDUSTRIAL APPLICABILITY

According to an information processing method according to the present invention, a program for realizing the method, or a recording medium on which the program is recorded, it is possible to reduce the storage capacity necessary for external storage means and the amount of information to be loaded from the external storage means into internal storage means. Accordingly, it is possible to reduce the scale and the cost of the system, and it is also possible to enhance the information processing speed in the system.

In addition, according to the information processing method according to the present invention, the program for realizing the method, or the recording medium on which the program is recorded, it is possible to easily change the function of a selected central processing unit without affecting the operation of another central processing unit, whereby it is possible to enhance the versatility of the system while ensuring the reliability of operation.

What is claimed is:

1. An information processing method realized in a system in which a processor including a plurality of central processing units and internal storage means, external storage means in which are stored a common code to be executed in common by the plurality of central processing units and an instruction code to be respectively executed by predetermined one of the central processing units, and host processing means are interconnected by a bus, the method characterized by comprising:

a step of loading, by means of one of the central processing units, the common code and the instruction code defined to be executed by one of the central processing units, into the internal storage means from the external storage means in accordance with an instruction from the host processing means, and loading, by means of one of other central processing units, the instruction code defined to be executed by the one of other central processing units, into the internal storage means from the external storage means; and a step of executing the common code and the instruction code defined to be executed by the respective central processing units, which are loaded in the internal storage means, by means of the respective central processing units, wherein the common code, the instruction code loaded by the one of the central processing units, and the instruction code loaded by the one of the other central processing units share a common address space in the internal storage means.

2. The information processing method according to claim 1, further comprising:
   a step of selectively resetting the central processing units by means of the host processing means;
   a step of newly loading an instruction code defined to be executed by a selectively reset one of the central processing unit, from the external storage means into the internal storage means by means of the selectively reset one itself in accordance with an instruction from the host processing means; and
   a step of executing, by means of the reset central processing unit, the instruction code defined to be executed by the reset central processing unit itself, which is newly loaded in the internal storage means.

3. An information processing method realized in a system in which a processor including a plurality of central processing units, internal storage means, boot storage means, and a direct memory access controller, external storage means in which are stored a common code to be executed in common by the plurality of central processing units and an instruction code to be respectively executed by predetermined one of the central processing units, and host processing means are interconnected by a bus, the method characterized by comprising:
   a step of selectively resetting, by means of the host processing means, the central processing unit;
   a step of writing, by means of the host processing means, a boot code to be executed by the reset central processing unit into the boot storage means;
   a step of canceling, by means of the host processing means, a reset state of the reset central processing unit;
   a step of loading, by means of one of the central processing units of which the reset state is canceled, the common code and the instruction code defined to be executed by the one of the central processing units of which the reset state is canceled, into the internal storage means from the external storage means with the use of the direct memory access controller, by executing the boot code written in the boot storage means by the one of the central processing units of which the reset state is canceled, and loading, by means of one of other central processing units of which the reset state is canceled, the instruction code defined to be executed by the one of other central processing units of which the reset state is canceled, into the internal storage means from the external storage means with the use of the direct memory access controller by executing the boot code written in the boot storage means by the one of other central processing units of which the reset state is canceled; and a step of executing, by means of the respective central processing units of which the reset states are canceled, the common code and the instruction code defined to be executed by the respective central processing units of which reset states are canceled, which are loaded in the internal storage means, wherein the common code, the instruction code loaded by the one of the central processing units, and the instruction code loaded by the one of the other central processing units share a common address space in the internal storage means.

4. The information processing method according to claim 3, further comprising:
   a step of selectively newly resetting, by means of the host processing means, the central processing unit;
   a step of writing, by means of the host processing means, a new boot code to be executed by the newly reset central processing unit into the boot storage means;
   a step of canceling, by means of the host processing means, a reset state of the newly reset central processing unit;
   a step of newly loading, by means of the central processing unit of which the reset state is canceled, the instruction code defined to be executed by the central processing unit of which the reset state is canceled into the internal storage means from the external storage means with the use of the direct memory access controller by executing the new boot code by the central processing unit of which the reset state is canceled;
   a step of executing, by means of the central processing unit of which the reset state is canceled, the instruction code defined to be executed by the central processing unit of which the reset state is canceled that is newly loaded in the internal storage means.

5. A program stored on a computer-readable medium for execution in a system in which a processor including a plurality of central processing units and internal storage means, external storage means in which are stored a common code to be executed in common by the plurality of central processing units and an instruction code to be respectively executed by predetermined one of the central processing units, and host processing means are interconnected by a bus, the program characterized by:
   causing one of the central processing units to load the common code and the instruction code defined to be executed by one of the central processing units, into the internal storage means from the external storage means in accordance with an instruction from the host processing means, in accordance with an instruction from the host processing means and causing one of other central processing units to load the instruction code defined to be executed by the one of other central processing units, into the internal storage means from the external storage means; and
   causing the respective central processing units to execute the common code and the instruction code defined to be executed by the respective central processing units, which are loaded in the internal storage means,
   wherein the common code, the instruction code loaded by the one of the central processing units, and the instruction code loaded by the one of the other central processing units share a common address space in the internal storage means.

6. The program according to claim 5, further characterized by:
   causing the host processing means to selectively reset the central processing unit;

causing the selectively reset central processing unit to newly load the instruction code defined to be executed by the reset central processing unit into the internal storage means from the external storage means in accordance with an instruction from the host processing means; and causing the reset central processing unit to execute the newly loaded instruction code defined to be executed by the reset central processing unit.

7. A program stored on a computer-readable medium for execution in a system in which a processor including a plurality of central processing units, internal storage means, boot storage means, and a direct memory access controller, external storage means in which are stored a common code to be executed in common by the plurality of central processing units and an instruction code to be respectively executed by a predetermined one of the central processing units, and host processing means are interconnected by a bus, characterized by:

causing the host processing means to selectively reset the central processing unit;

causing the host processing means to write a boot code to be executed by the reset central processing unit into the boot storage means;

causing the host processing means to cancel a reset state of the reset central processing unit;

causing one of the central processing units of which the reset state is canceled to load the common code and the instruction code defined to be executed by one of the central processing units of which the reset state is canceled, into the internal storage means from the external storage means with the use of the direct memory access controller, by executing the boot code written in the boot storage means by one of the central processing units of which the reset state is canceled, and causing one of other central processing units of which the reset state is canceled to load the instruction code defined to be executed by the one of other central processing units of which the reset state is canceled, into the internal storage means from the external storage means with the use of the direct memory access controller by executing the boot code written in the boot storage means by the one of other central processing units of which the reset state is canceled; and causing the respective central processing units of which the reset states are canceled to execute the common code and the instruction code defined to be executed by the respective central processing units of which the reset states are canceled, which are loaded in the internal storage means, wherein the common code, the instruction code loaded by the one of the central processing units, and the instruction code loaded by the one of the other central processing units share a common address space in the internal storage means.

8. The program according to claim 7, further characterized by:

causing the host processing means to selectively newly reset the central processing unit;

causing the host processing means to write a new boot code to be executed by the newly reset central processing unit into the boot storage means;

causing the host processing means to cancel a reset state of the newly reset central processing unit;

causing the central processing unit of which the reset state is canceled to newly load the instruction code defined to be executed by the central processing unit of which the reset state is canceled into the internal storage means from the external storage means with the use of the direct memory access controller by executing the new boot code by the central processing unit of which the reset state is canceled;

causing the central processing unit of which the reset state is canceled to execute the instruction code defined to be executed by the central processing unit of which the reset state is canceled that is newly loaded in the internal storage means.

9. A recording medium in which a program is written, the program being executed in a system in which a processor including a plurality of central processing units and internal storage means, external storage means in which are stored a common code to be executed in common by the plurality of central processing units and an instruction code to be respectively executed by a predetermined one of the central processing units, and host processing means are interconnected by a bus, the recording medium characterized in that:

the program causes one of the central processing units to load the common code and the instruction code defined to be executed by one of the central processing units, into the internal storage means from the external storage means in accordance with an instruction from the host processing means, in accordance with an instruction from the host processing means and causing one of other central processing unit to load the instruction code defined to be executed by the one of other central processing units, into the internal storage means from the external storage means; and the program causes the respective central processing units to execute the common code and the instruction code defined to be executed by the respective central processing units that are loaded in the internal storage means, wherein the common code, the instruction code loaded by the one of the central processing units, and the instruction code loaded by the one of the other central processing units share a common address space in the internal storage means.

10. The recording medium according to claim 9, further characterized in that:

the program causes the host processing means selectively to reset the central processing unit;

the program causes the selectively reset central processing unit to newly load the instruction code defined to be executed by the reset central processing unit into the internal storage means from the external storage means in accordance with an instruction from the host processing means; and the program causes the reset central processing unit to execute the newly loaded instruction code defined to be executed by the reset central processing unit.

11. A recording medium in which a program is written, the program being executed in a system in which a processor including a plurality of central processing units, internal storage means, boot storage means, and a direct memory access controller, external storage means in which are stored a common code to be executed in common by the plurality of central processing units and an instruction code to be respectively executed by predetermined one of the central processing units, and host processing means are interconnected by a bus, the recording medium characterized in that:

the program causes the host processing means to selectively reset the central processing unit;

the program causes the host processing means to write a boot code to be executed by the reset central processing unit into the boot storage means;

the program causes the host processing means to cancel a reset state of the reset central processing unit;

the program causes one of the central processing units of which the reset state is canceled to load the common code and the instruction code defined to be executed by one of the central processing units of which the reset state is canceled, into the internal storage means from the external storage means with the use of the direct memory access controller, by executing the boot code written in the boot storage means by one of the central processing units of which the reset state is canceled, and the program causes one of other central processing units of which the reset state is canceled to load the instruction code defined to be executed by the one of other central processing units of which the reset state is canceled, into the internal storage means from the external storage means with the use of the direct memory access controller by executing the boot code written in the boot storage means by the one of other central processing units of which the reset state is canceled; and the program causes the respective central processing units of which the reset states are canceled to execute the common code and the instruction code defined to be executed by the respective central processing units of which the reset states are canceled, which are loaded in the internal storage means, wherein the common code, the instruction code loaded by the one of the central processing units, and the instruction code loaded by the one of the other central processing units share a common address space in the internal storage means.

12. The recording medium according to claim 11, characterized in that:

the program causes the host processing means to newly selectively reset the central processing unit;

the program causes the host processing means to write a new boot code to be executed by the newly reset central processing unit into the boot storage means;

the program causes the host processing means to cancel a reset state of the newly reset central processing unit;

the program causes the central processing unit of which the reset state is canceled to newly load the instruction code defined to be executed by the central processing units of which the reset state is canceled, into the internal storage means from the external storage means with the use of the direct memory access controller, by executing the new boot code by the central processing units of which the reset state is canceled; and the program causes the central processing unit of which the reset state is canceled to execute the instruction code defined to be executed by the central processing unit of which the reset states is canceled that is loaded in the internal storage means.

\* \* \* \* \*

UNITED STATES PATENT AND TRADEMARK OFFICE
CERTIFICATE OF CORRECTION

| | | |
|---|---|---|
| PATENT NO. | : 7,363,481 B2 | Page 1 of 1 |
| APPLICATION NO. | : 10/523786 | |
| DATED | : April 22, 2008 | |
| INVENTOR(S) | : Shigeo Sugimori et al. | |

It is certified that error appears in the above-identified patent and that said Letters Patent is hereby corrected as shown below:

On the Title Page:
Item (75) should read:
-- Shigeo Sugimori, Tokyo (JP) --.

Signed and Sealed this

Eighth Day of July, 2008

JON W. DUDAS
*Director of the United States Patent and Trademark Office*